(12) United States Patent
Gilbert et al.

(10) Patent No.: US 9,346,464 B2
(45) Date of Patent: May 24, 2016

(54) POWER TAKE-OFF FOR ENGINE USED IN MULTI-FUNCTION SYSTEM AND LOAD MANAGEMENT OF SUCH SYSTEM

(71) Applicant: VMAC, a division of Mangonel Investments Corporation, Nanaimo (CA)

(72) Inventors: Tod Gilbert, Nanaimo (CA); Peter Ivan Dahle, Nanaimo (CA); Maciej Pater, Nanaimo (CA)

(73) Assignee: VMAC Global Technology Inc., Nanaimo, British Columbia ( * ) Notice: Subject to any disclaimer, the term of this patent is extended or adjusted under 35 U.S.C. 154(b) by 147 days.

(21) Appl. No.: 14/182,081

(22) Filed: Feb. 17, 2014

(65) Prior Publication Data

US 2014/0235403 A1    Aug. 21, 2014

Related U.S. Application Data

(60) Provisional application No. 61/765,566, filed on Feb. 15, 2013.

(51) Int. Cl.
| | | |
|---|---|---|
| *B60W 10/30* | (2006.01) | |
| *B60W 30/188* | (2012.01) | |
| *B60W 10/06* | (2006.01) | |

(Continued)

(52) U.S. Cl.
CPC ........... *B60W 30/1888* (2013.01); *B60W 10/06* (2013.01); *B60W 10/30* (2013.01); *B60W 2050/0093* (2013.01); *F02B 67/04* (2013.01); *Y10T 477/613* (2015.01)

(58) Field of Classification Search
CPC .............................. B60L 1/003; B60W 10/30
See application file for complete search history.

(56) References Cited

U.S. PATENT DOCUMENTS

| | | | |
|---|---|---|---|
| 2,618,980 | A | 4/1960 | Cook et al. |
| 3,001,409 | A | 9/1961 | Von Fumetti |
| 3,482,456 | A | 12/1969 | May et al. |

(Continued)

FOREIGN PATENT DOCUMENTS

| | | |
|---|---|---|
| DE | 2116119 | 10/1972 |
| WO | 0132459 | 5/2001 |

(Continued)

OTHER PUBLICATIONS

WPT Power Corporation, Mechanical Power Take-Off Clutches Brochure, available Sep. 10, 2013.

*Primary Examiner* — Tisha Lewis
(74) *Attorney, Agent, or Firm* — Todd A. Rattray; Oyen Wiggs Green & Mutala LLP

(57) ABSTRACT

An apparatus comprising an engine, a power take-off to be driven by the engine, one or more load services to be driven by the engine, a PTO modulator coupled to the power-takeoff output port and operable to selectively engage the power take-off to the engine to provide output rotational power, one or more load-service modulators coupled to the one or more load services and operable to selectively engage the one or more load services to the engine to provide service outputs, and a load controller configured to selectively operate the PTO modulator and the one or more load-service modulators to change the output from the power take-off or the one or more load services based on a condition of the engine and a load priority assigned to the power take-off or the one or more load services.

20 Claims, 6 Drawing Sheets

(51) Int. Cl.
*F02B 67/04* (2006.01)
*B60W 50/00* (2006.01)

(56) References Cited

U.S. PATENT DOCUMENTS

| | | | |
|---|---|---|---|
| 3,513,712 | A | 5/1970 | Zajichek et al. |
| 5,134,901 | A | 8/1992 | Grady |
| 6,051,809 | A | 4/2000 | Colella |
| 6,073,428 | A * | 6/2000 | Diekhans ............ A01D 41/1274 123/352 |
| 6,478,714 | B2 | 11/2002 | Onnen et al. |
| 6,534,958 | B1 | 3/2003 | Graber et al. |
| 6,547,527 | B2 | 4/2003 | Gaither |
| 6,674,046 | B2 | 1/2004 | Bankstahl et al. |
| 6,933,465 | B2 | 8/2005 | Bankstahl et al. |
| 6,989,509 | B2 | 1/2006 | Silvestro |
| 6,992,265 | B2 | 1/2006 | Bender et al. |
| 7,013,646 | B1 | 3/2006 | Serkh et al. |
| 7,098,424 | B2 | 8/2006 | Silvestro |
| 7,105,774 | B2 | 9/2006 | Bender et al. |
| 7,642,487 | B2 | 1/2010 | Silvestro |
| 7,726,275 | B2 | 6/2010 | Deniston et al. |
| 7,745,946 | B2 | 6/2010 | Ambrose |
| 7,868,269 | B2 | 1/2011 | Silvestro |
| 8,261,717 | B2 | 9/2012 | Peotter et al. |
| 8,464,526 | B2 | 6/2013 | Renner |
| 2006/0027547 | A1 | 2/2006 | Silvestro |
| 2008/0122195 | A1 | 5/2008 | Beeson et al. |
| 2008/0264919 | A1 | 10/2008 | Helf et al. |
| 2008/0264920 | A1 | 10/2008 | Leisner et al. |
| 2008/0264921 | A1 | 10/2008 | Kropp et al. |
| 2008/0264922 | A1 | 10/2008 | Fosbinder |
| 2009/0218327 | A1 | 9/2009 | Beeson |
| 2009/0314563 | A1 * | 12/2009 | Burkholder ........... B60W 10/06 180/65.265 |
| 2010/0072757 | A1 | 3/2010 | Kealy et al. |
| 2010/0286856 | A1 * | 11/2010 | Le Brusq ................. B60K 6/28 701/22 |
| 2011/0155888 | A1 | 6/2011 | Jordahl |
| 2012/0056474 | A1 * | 3/2012 | Larson .................... B60R 16/03 307/9.1 |
| 2012/0266701 | A1 * | 10/2012 | Yamada ................. B60K 6/383 74/15.82 |

FOREIGN PATENT DOCUMENTS

| | | | |
|---|---|---|---|
| WO | 2007067178 | | 6/2007 |
| WO | WO2011074345 a1 * | 6/2011 | ............ B60W 10/30 |

* cited by examiner

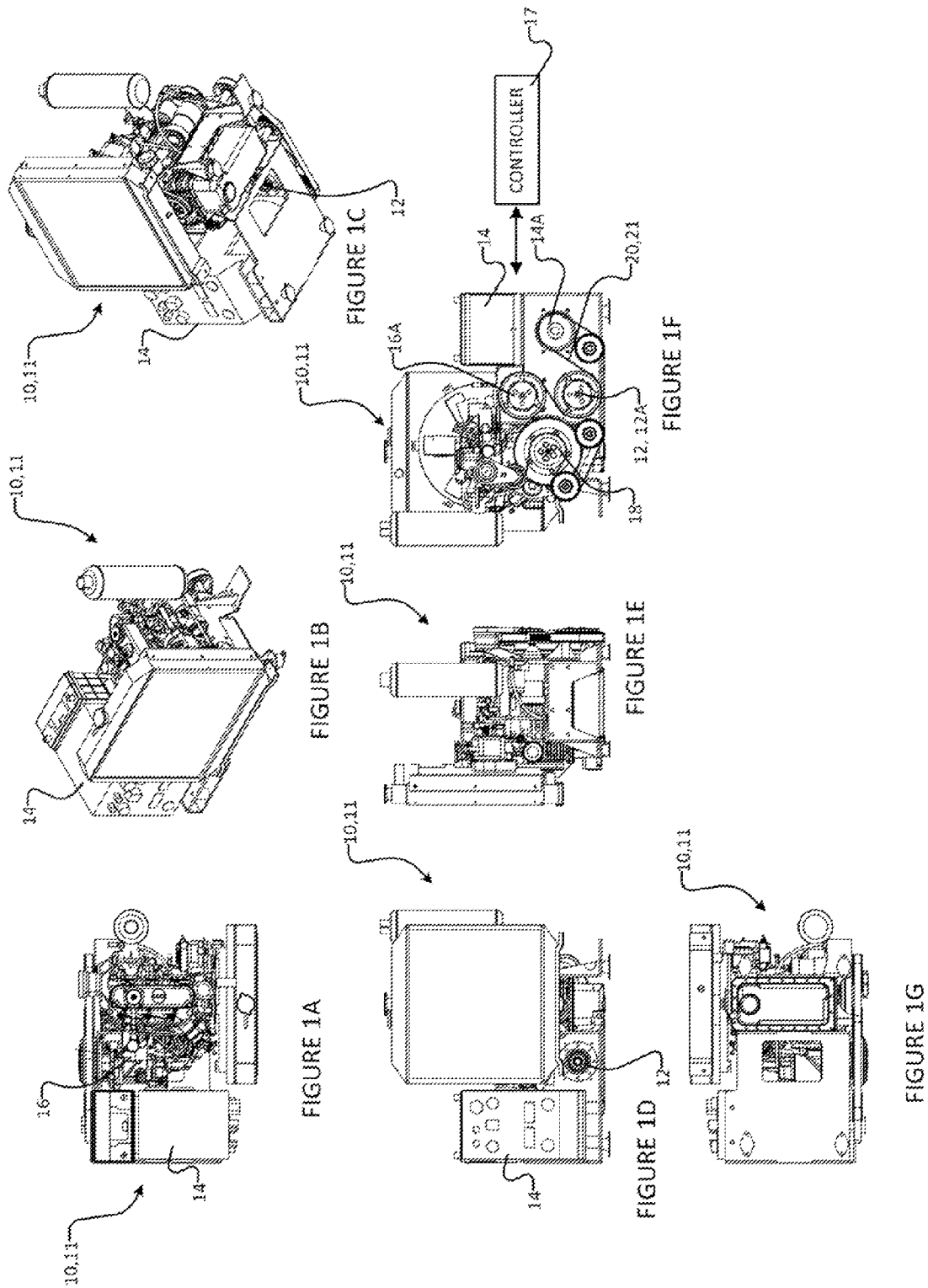

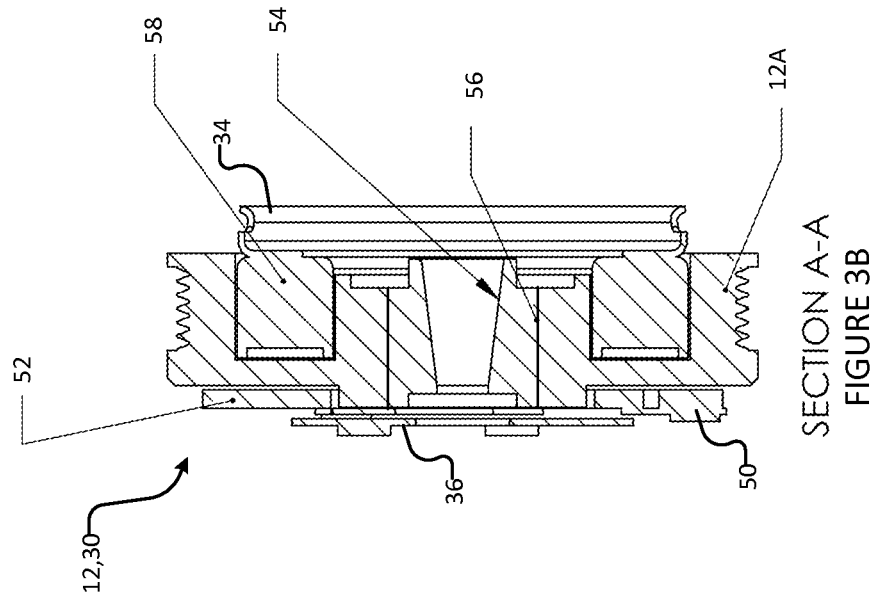
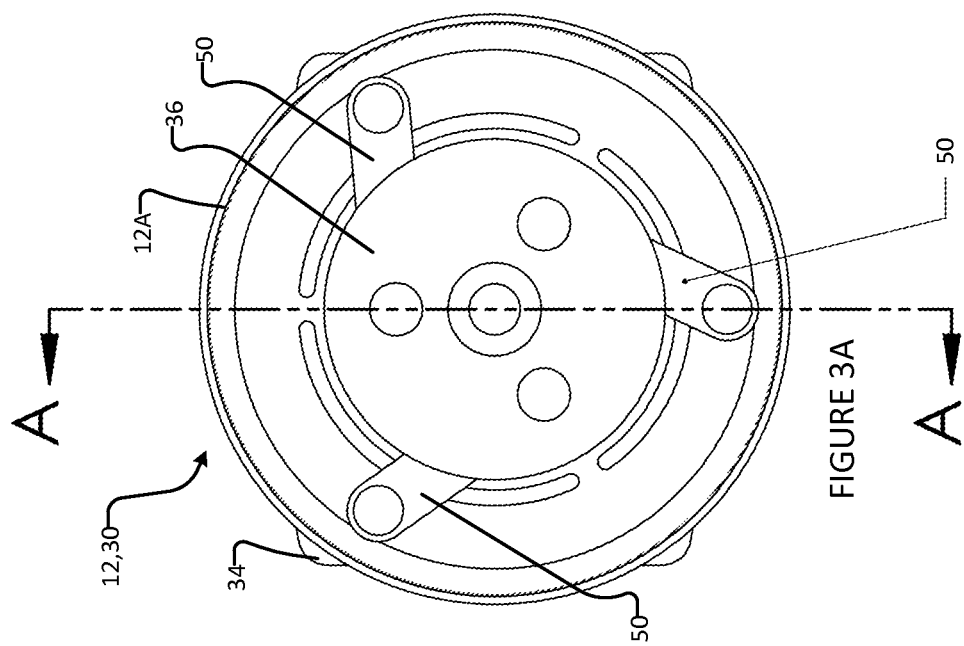
FIGURE 3A
SECTION A-A
FIGURE 3B

POWER TAKE-OFF FOR ENGINE USED IN MULTI-FUNCTION SYSTEM AND LOAD MANAGEMENT OF SUCH SYSTEM

TECHNICAL FIELD

The technology described herein relates to engines. Particular embodiments, provide power take-offs for extracting power from engines for use to power other devices and load management of systems incorporating such engines.

BACKGROUND

There is a general desire for engines capable of being used for multiple purposes (e.g. in multi-function systems). There is a general desire to extract power from such engines which power may be able to be used to power other devices and to manage the loads in systems incorporating such engines. For example, Miller Electric Manufacturing Co. of Appleton Wis. provides multi-function systems equipped with diesel engines under the brand-name ENPAK™. Such engines may be used to provide power for an electrical generator, an air compressor and a hydraulic pump which are provided integrally with the multi-function system. The hydraulic pump of the ENPAK™ multi-function system is sold as a part of the multi-function system itself and comprises a variable displacement hydraulic pump where the pump displacement is varied based on pressure feedback.

A drawback with variable displacement hydraulic pumps is that their components are relatively more sensitive (e.g. less robust) and more complex (e.g. to control) in comparison to fixed displacement hydraulic pumps. Further, variable displacement pumps are generally more expensive than fixed displacement hydraulic pumps. Some users may not need variable displacement hydraulic pumps. Some users may want to provide their own hydraulic pump which may be suited to their particular needs. Some users may want to change hydraulic pumps from time to time. Some users may also want to vary the type of accessory devices in a multi-function system. For example, some users may want to have a multi-function system with a drive shaft output which may provide mechanical power to some other accessory device such as a water pump, an auger and/or the like. As another example, some users may want switch from time to time between a hydraulic pump and a drive shaft output which provides mechanical power to some other accessory device such as a water pump, an auger and/or the like.

There is a general desire to provide engines with power take-offs (also referred to as PTOs or power take-off ports) for extracting power from the engines for use to power other devices. By way of non-limiting example, such other devices may include hydraulic pumps and/or the like. There is a general desire to permit users to be able to relatively easily connect and disconnect their own devices to such power take-offs.

Emissions standards for off-highway engines have been getting relatively stricter, particularly for off-highway engines having greater than specified power outputs. By way of non-limiting example, in the case of diesel off-highway engines, the United States Environmental Protection Agency (EPA) and similar standards bodies in other countries have adopted the Tier 4 standard for diesel off-highway engines. These emissions standards are easier to meet for relatively small power engines (e.g. engines under 25 horsepower (19 kW) have emissions standards that are relatively less strict than engines over 25 hp (19 kW)). For example, engines under 25 hp (19 kW) require NMHC+$NO_x$ emissions of less than 7.5 g/kW-hr (a standard that has not changed since 2005), whereas engines having the next higher classification (19 kW-37 kW) require NMHC+$NO_x$ emissions of less than 4.7 g/kW-hr (a standard that has decreased as of 2013). Accordingly, there is a general desire to provide off-highway engines having relatively low power outputs (e.g. less than 25 hp (19 kW) or less than some other suitable power threshold). At the same time, however, there is a competing desire to maximize the power output available at power take-offs to thereby provide maximum versatility to the types of devices that can be coupled to such power take-offs and the types of applications for which such devices can be used.

There is a general desire to manage the loads for multi-function systems incorporating power take-offs and used to provide power to a number of different accessories. By way of non-limiting example, such load management can be used to mitigate against engine overloading, engine wear, to attempt to achieve optimum performance of accessory devices, to mitigate against accessory damage and accessory wear and/or the like.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrate, not limiting in scope. In various embodiments, one or more of the above-described problems have been reduced or eliminated, while other embodiments are directed to other improvements.

One aspect of the invention provides an apparatus comprising an engine, a power take-off to be driven by the engine and one or more load services to be driven by the engine. The apparatus also comprises a PTO modulator coupled to the power take-off and operable to selectively engage the power take-off to the engine to provide output rotational power, one or more load-service modulators coupled to the one or more load services and operable to selectively engage the one or more load services to the engine to provide service outputs, and a load controller configured to selectively operate the PTO modulator and the one or more load-service modulators to change the output from the power take-off or the one or more load services based on a condition of the engine and a load priority assigned to the power take-off or the one or more load services.

In some embodiments, each of the one or more load services comprises an air compressor, electrical generator, battery booster, welder, or a hydraulic pump. In other embodiments, the load priority is assigned by a user. The engine condition may be engine speed at a threshold level. The engine threshold level may be defined by a user. In yet further embodiments, the PTO modulators comprise a clutch. In some embodiments, the power take-off is located remotely from the crankshaft of the engine and the engine comprises a belt connected between the engine and the power take-off for driving the power take-off. In yet other embodiments, the apparatus comprises a crankshaft pulley connected to the engine's crankshaft and a power take-off pulley connected to the power take-off, the belt entrained around the crankshaft pulley and the power take-off pulley whereby rotation of the crankshaft pulley causes rotation of the power take-off pulley to drive the power take-off. In further embodiments, a flywheel is involved in rotating the power take-off pulley. In some embodiments, the PTO modulator or the load-service modulator comprises a modulator that is operable to increase or decrease the output from the power take-off or the load service.

Another aspect of the invention provides managing the load of an engine driving a power take-off and one or more load services. The method comprises the steps of assigning a load priority to the power take-off or one or more load services, calculating the speed of the engine; and reducing output from the power take-off or one or more load services that have lower priorities when the engine speed is below a threshold.

In some embodiments, each of the load services comprises an air compressor, electrical generator, battery booster, welder, or a hydraulic pump. In other embodiments, the engine threshold is defined by a user. In yet other embodiments, the load priority is assigned by a user. In further embodiments, the power take-off is located remotely from the crankshaft of the engine.

Another aspect of the invention provides an apparatus comprising: an engine; a power take-off comprising a power take-off port operatively connected to be driven by the engine and connectable to a corresponding load service; one or more additional load services operatively connected to be driven by the engine; a PTO modulator coupled to the power take-off and operable to modulate power drawn, from the engine, by the power take-off; one or more load-service modulators respectively coupled to the one or more additional load services, each load-service modulator operable to modulate power drawn, from the engine, by its corresponding additional load service; and a controller configured to control the PTO modulator and the one or more load-service modulators to thereby control the power drawn from the engine based on a detected condition of the engine and a priority as between the power take-off and the one or more additional load services.

In some embodiments, the power take-off comprises a power take-off port located remotely from a crankshaft of the engine in a location which provides space for operative connection of any one of a variety of accessory devices to the power take-off port, the apparatus comprising: a crankshaft pulley coupled to rotate with the crankshaft; a power take-off pulley coupled, via the PTO modulator, to rotate with the power take-off port; and a belt entrained around the crankshaft pulley and the power take-off pulley for transferring rotational energy therebetween. In some embodiments, the power take-off comprises a power take-off port located remotely from a crankshaft of the engine in a location which provides space for operative connection of any one of a variety of accessory devices to the power take-off port, the apparatus comprising: a flywheel connected to rotate with the crankshaft; an engine pulley coupled to rotate with the flywheel; a power take-off pulley coupled, via the PTO modulator, to rotate with the power take-off port; and a belt entrained around the engine pulley and the power take-off pulley for transferring rotational energy therebetween.

In some embodiments, the PTO modulator comprises a modulator having an ON state, wherein the power take-off is connected to draw power from the engine and an OFF state, wherein the power take-off is de-coupled from the engine so as not to draw power therefrom, and wherein at least one of the one or more load-service modulators comprises a modulator having an ON state, wherein the its corresponding additional load service is connected to draw power from the engine and an OFF state, wherein its corresponding additional load service is de-coupled from the engine so as not to draw power therefrom. In some embodiments, the PTO modulator comprises a variable-speed modulator operative for controlling the power drawn, from the engine, by the power take-off by increasing and decreasing the power drawn, from the engine, by the power take-off. In some embodiments, at least one of the one or more load-service modulators comprises a variable-speed modulator operative for controlling the power drawn, from the engine, by its corresponding additional load service by increasing and decreasing the power drawn, from the engine, by its corresponding additional load service.

In some embodiments, the engine condition comprises an overload condition which comprises an engine speed being below a threshold level. The overload condition may comprise the engine speed being below a threshold level, relative to a configurable desired engine speed, for a threshold period of time. The configurable desired engine speed may be configurable to any one of a plurality of discrete speed modes, each speed mode comprising a corresponding target speed. A user interface or one or more user-interface controls may be provided for user configuration of any one or more of: the plurality of discrete speed modes, the corresponding target speeds, the threshold periods of time; and the threshold levels.

In some embodiments, a user interface or one or more user-interface controls is provided for user configuration of the priority as between the power take-off and the one or more additional load services.

In some embodiments, the controller is configured to control the PTO modulator and the one or more load service modulators to thereby control the output power drawn from the engine based on the detected engine condition and the priority as between the power take-off and the one or more additional load services by reducing the power drawn from the engine by reducing a power drawn by a lowest priority one of the power take-off and the one or more additional load services and, if the engine condition is not alleviated after reducing the power drawn by the lowest priority one of the power take-off and the one or more additional load services to zero, then reducing a power drawn by a different one of the power take-off and the one or more additional load services.

In some embodiments, the controller is configured to control the PTO modulator and the one or more load service modulators to thereby control the output power drawn from the engine based on the detected engine condition and the priority as between the power take-off and the one or more additional load services by reducing the power drawn from the engine by reducing a power drawn by a lowest priority one of the power take-off and the one or more additional load services by a first amount, the first amount less than a full power drawn by the lowest priority one of the power take-off and the one or more additional load services and, if the engine condition is not alleviated after reducing the power drawn by the lowest priority one of the power take-off and the one or more additional load services by the first amount, then reducing a power drawn by a different one of the power take-off and the one or more additional load services by a second amount, the second amount less than a full power drawn by the different one of the power take-off and the one or more additional load services.

The controller may be configured to control the PTO modulator and the one or more load service modulators to thereby control the output power drawn from the engine based on the detected engine condition and the priority as between the power take-off and the one or more additional load services by further reducing the power drawn by the lowest priority one of the power take-off and the one or more additional load services by a third amount, if the engine condition is not alleviated after reducing the power drawn by the different one of the power take-off and the one or more additional load services by the second amount. The controller may be configured to control the PTO modulator and the one or more load service modulators to thereby control the output power drawn from the engine based on the detected engine condition and the priority as between the power take-off and the one or more additional load services by reducing a power drawn by a further different one of the power take-off and the one or more additional load services by a third amount, if the engine condition is not alleviated after reducing the power drawn by the different one of the power take-off and the one or more additional load services by the second amount.

Another aspect of the invention provides a method for managing the load of an engine driving a power take-off and one or more additional load services, the method comprising: providing an engine, a power take-off comprising a power take-off port operatively connected to be driven by the engine and connectable to a corresponding load service; and one or more additional load services operatively connected to be driven by the engine; detecting a speed of the engine; evaluating an overload condition based at least in part on the detected speed of the engine; and if the overload condition is positive, controlling the power drawn by at least one of the power take-off and the one or more additional services to control power drawn from the engine in accordance with a priority as between the power take-off and the one or more additional services.

In some embodiments, evaluating the overload condition comprises determining that an engine speed is below a threshold level, relative to a configurable desired engine speed, for a threshold period of time. In some embodiments, the method comprises using a moving average filter on a detected engine speed to determine the engine speed prior compared to the threshold level.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 1A-1G (collectively, FIG. 1) show various views of an engine provided with a power take-off according to a particular embodiment of the invention.

FIGS. 3A and 3B (collectively, FIG. 3) show a front plan and cross-sectional view of the clutch mechanism of the FIG. 2 power take-off according to an example embodiment.

DESCRIPTION

Figure 2B:
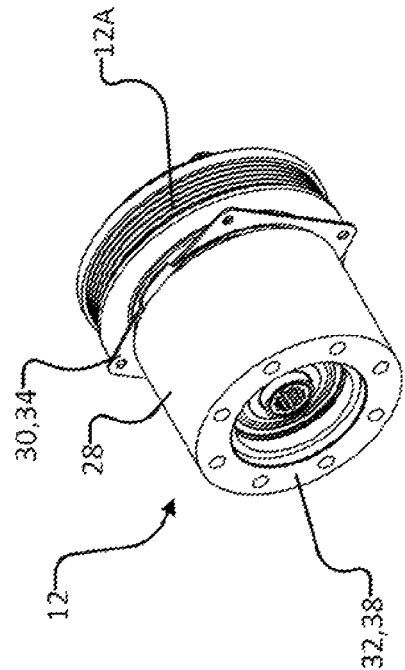
FIGS. 2A-2E (collectively, FIG. 2) show various views of the power take-off of the FIG. 1 engine according to an example embodiment.
Figure 2E:
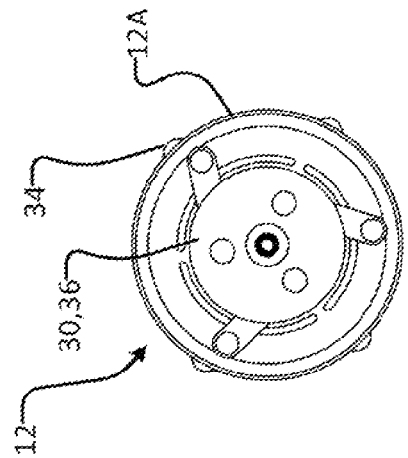
Figure 2D:
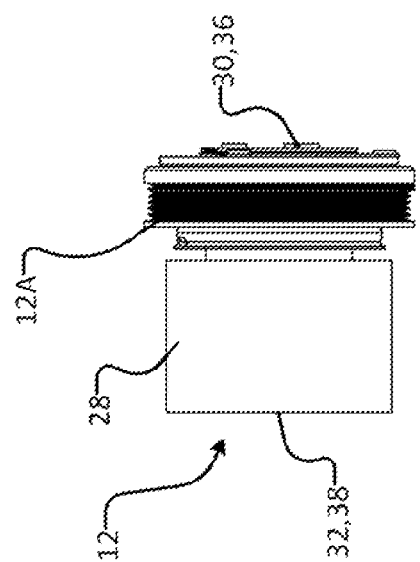
Figure 2A:
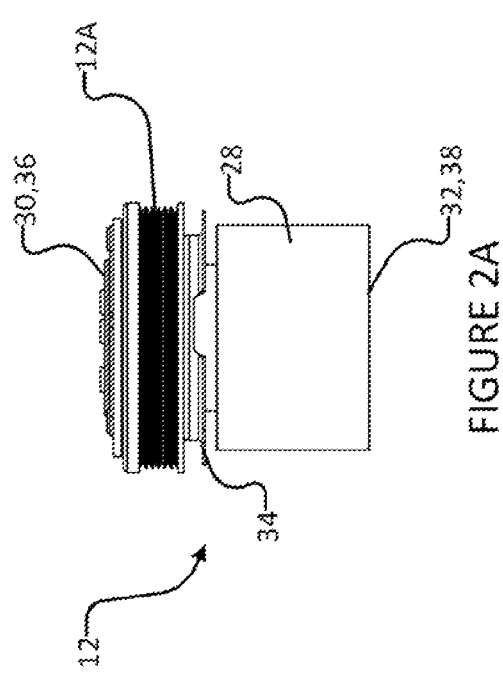

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a multi-function system comprising: engine (which may be less than 19 kW, for example) and a clutched power take-off. In some embodiments, the power take-off may be driven by a belt system. The belt system may comprise a belt entrained over a crankshaft pulley connected directly to the crankshaft of the engine. With such a configuration, the power take-off may have access to up to 100% of the power available at the crankshaft (absent any losses to friction or the like). The belt system may permit the power take-off to be spaced apart from the engine (and its crankshaft) to thereby permit the attachment of relatively large accessories (as compared to power take-offs which do not use a belt system). In some embodiments, the power take-off comprises an industry standard PTO port.

FIGS. 1A-1G (collectively, FIG. 1) shows an engine 10 comprising a power take-off 12 according to a particular embodiment of the invention. In the illustrated embodiment, engine 10 comprises a diesel engine having less than 25 hp (19 kW). However, in other embodiments, engine 10 could comprise a higher power (larger) engine.

Engine 10 of the illustrated embodiment comprises part of a multi-function system 11, wherein engine 10 also powers a generator 14 and an air compressor 16 which are part of multi-function system 11. In the illustrated embodiment, generator 14 is capable of providing AC power (single phase and multi-phase), DC power (e.g. for welding), battery charging functionality and battery boosting functionality. In some embodiments, multi-function system 11 may provide fewer functionalities (e.g. multi-function system 11 may not comprises a generator 14 or may not comprise an air compressor 16). In some embodiments, multi-function system 11 may comprise additional functionalities which may be embodied as other devices powered by engine 10 (load services). In some embodiments, multi-function system 11 may be mounted in a vehicle (e.g. a work truck), although this is not necessary.

Power take-off 12 may be provided in the form of or may otherwise comprise an industry standard power take-off (PTO) port. In the illustrated embodiment, power take-off 12 comprises a SAE "A" standard PTO port. However, power take-off 12 could comprise a different industry standard PTO port, such as (by way of non-limiting example) a SAE "B" port, a Q-mount port and/or the like. Typically, a PTO port standard will standardize the properties of the PTO mounting flange (e.g. bolt pattern and location and alignment features) and the properties of the PTO shaft (e.g. shaft diameter and spline characteristics). A PTO port standard allows engine 10 to power existing accessory devices (referred to as load services) designated to be compatible with the port standard without using custom pulleys or other custom mounting hardware.

Providing power take-off 12 in a standard format, permits users to couple their own accessory devices (not shown) equipped with complementary standard power input ports to power take-off 12 so that such accessory devices (referred to as load services) may be powered by engine 10. One non-limiting example of an accessory device that could be coupled to power take-off 12 is a hydraulic pump—e.g. for operation of a crane or other hydraulic equipment. In the case of connecting power take-off 12 to a hydraulic pump, a benefit of providing power take-off 12 in the form of a standard PTO port is that users may select their own hydraulic pump which may be sized for the corresponding hydraulic equipment that the user plans to use. Because users know the likely applications of their hydraulic equipment, selection of their own hydraulic pump provides the benefit of being able to select a fixed displacement hydraulic pump (which outputs a fixed volume of hydraulic oil at a given pump speed). When compared to variable displacement hydraulic pumps provided integrally with prior art multi-function systems, fixed displacement hydraulic pumps are relatively inexpensive, more robust and more compact. It should be noted that providing power take-off 12 with a standard PTO port format does not limit a user to choosing a fixed displacement hydraulic pump. A user may still couple a variable displacement hydraulic pump to power take-off 12, if such a variable displacement pump were desired. Further, the advantages associated with the standard format power take-off 12 are not limited to hydraulic pumps. Similar advantages may be obtained when coupling other accessory devices to a standard PTO port.

In particular embodiments, multi-function system 11 may be provided with a relatively low-power engine 10 (e.g. 25 horsepower (19 kW) and under) and a power take-off 12 comprising a standard PTO port (e.g. SAE "A", SAE "B", Q-mount port, and/or the like) which is capable of fully loading engine 10. That is, in some embodiments, substantially all of the output power of the small engine 10 (e.g. 25 horsepower (19 kW) and under) is available at the standard PTO port of power take-off 12. In some embodiments, these standard PTO ports can be de-coupled or disengaged from engine 10 (e.g. when other services are a priority) to permit load management as described in more detail below.

In other embodiments, power take-off 12 need not be industry standard and may be customized for particular applications.

In the illustrated embodiment, power take-off 12 is driven by a belt system 20, wherein a belt 21 is entrained around an engine pulley 18 and a PTO pulley 12A. In some embodiments, PTO 12A may be clutched or form part of a clutch mechanism 30 (as described below). In the illustrated embodiment (as shown best in FIG. 1F), belt 21 is also entrained around an air compressor drive pulley 16A (for driving air compressor 16) and a generator pulley 14A (for driving generator 14). In other embodiments, a suitable configured chain system and chain may be used in the place of belt system 20 and belt 21. In such embodiments, pulleys 12A, 14A and 16A may be replaced by suitably configured sprockets, suitably configured modulators, suitably configured clutches and/or the like. Belt system 20 permits power take-off 12 to be spaced apart from engine 10 which in turn allows the use of a bigger PTO port, because space is not constrained relative to prior art small engine power take-offs where the PTO port is located relatively close to the engine.

Engine pulley 18 of the illustrated embodiment is directly coupled to the flywheel (not expressly shown) of engine 10 which in turn is directly coupled to the crankshaft (not expressly shown) of engine 10. In some embodiments, this coupling of engine pulley 18 through the flywheel and crankshaft could comprise a clutch mechanism to engage/disengage all loads from engine 10. This coupling of engine pulley 18 through the flywheel and crankshaft permits substantially the full power output of engine 10 (absent any losses to friction or the like in belt system 20 and possibly some small losses in the flywheel bearing) to be available at power take-off 12. This coupling of engine pulley 18 to the crankshaft directly through the flywheel contrasts with prior art power take-offs for small engines. Prior art power take-offs for small engines are typically coupled by gearing mechanisms to the camshafts of their corresponding engines which are in turn coupled with suitable mechanisms to the crankshafts of their corresponding engines. With these prior art power take-offs, there may be power losses in the mechanisms that couple the camshafts to the power take-offs and there may be additional power losses in the mechanisms that couple the camshafts to the crankshafts, such that the full power output of engine 10 may not be available at the prior art power take-off. Further, with these prior art power take-offs driven by the cam-shafts of corresponding engines, the output torque available to drive accessory devices is less than would be available from crankshaft-driven mechanisms.

Figure 2C:
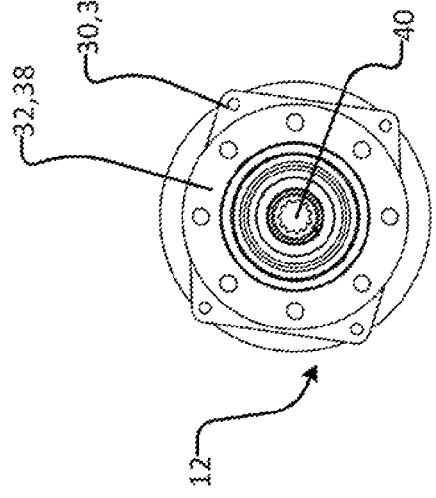

FIGS. 2A-2E (collectively, FIG. 2) show more detail of power take-off 12 according to a particular example embodiment. As shown in FIG. 2, power take-off 12 comprises: a PTO pulley 12A, a bearing support 28, a clutch mechanism 30 and a PTO port 32. Bearing support 28 is used to support power take-off 12 in its desired location relative to engine 10. In the illustrated embodiment, bearing support 28 is generally cylindrically shaped (although it could generally have any other suitable shape) and bearing support 28 is received in a complementary shaped retainer (although it could be attached directly to engine 10 or a suitable frame (not shown)). As explained above, belt mechanism 20 and belt 21 couple crankshaft pulley 18 to PTO pulley 12A, such that PTO pulley 12A is rotating whenever crankshaft pulley 18 is rotating. Clutch mechanism 30 of the particular example embodiment comprises a clutch stator 34 and a clutch plate 36. As explained in more detail below, clutch plate 36 of the illustrated embodiment is moveable relative to clutch stator 34 to engage or disengage clutch plate 36 from PTO pulley 12A and to thereby provide clutching functionality between PTO pulley 12A and the output of PTO port 32. As shown in FIG. 2C, PTO port 32 comprises a PTO mount flange 38 and a splined PTO shaft 40. In the particular case of the illustrated embodiment, PTO shaft 40 is coupled to rotate with moveable clutch plate 36, such that when clutch plate 36 is rotating, PTO shaft 40 is similarly rotating. More particularly, when clutch plate 36 is moved to engage PTO pulley 12A, the rotation of PTO pulley 12A (driven by crankshaft pulley 18 and belt system 20) causes corresponding rotation of clutch plate 36 and corresponding rotation of PTO shaft 40. The rotation of PTO shaft 40 may be used to drive accessory devices which may be mounted to PTO mount flange 38.

Clutch mechanism 30 of the illustrated embodiment is explained in more detail with reference to the detailed plan view of FIG. 3A and the cross-sectional view of FIG. 3B. Clutch mechanism 30 of the illustrated embodiment comprises a clutch stator 34 and a moveable clutch plate 36. In the particular case of the illustrated example embodiment shown in FIG. 3, clutch mechanism 30 comprises an electromagnetic clutch which is actuated by stationary electromagnetic coil 58 mounted to stator 34. As discussed above, PTO pulley 12A is driven by belt system 20 (FIG. 1F) so that PTO pulley 12A rotates whenever crankshaft pulley 18 (FIG. 1F) rotates. Clutch plate 36 is coupled to rotate with receptacle 54 which in turn receives PTO shaft 40 (FIG. 2C), such that clutch plate 36 is coupled to rotate with PTO shaft 40. As shown in FIG. 3B, clutch mechanism 30 comprises a bearing 56 which decouples PTO pulley 12A from receptacle 54, such that rotation of PTO pulley 12A does not cause corresponding rotation of receptacle 54, unless clutch mechanism 30 is engaged as explained further below.

Clutch mechanism 30 of the particular illustrated example embodiment also comprises one or more (e.g. three in the illustrated embodiment) spring mechanisms 50 which tend to bias clutch plate 36 away from PTO pulley 12A to provide a space between clutch plate 36 and PTO pulley 12A. When clutch mechanism 30 is disengaged, there is no power in coil 58 and no corresponding magnetic flux. The result is that spring mechanisms 50 move clutch plate 36 away from PTO pulley 12A, so that PTO pulley 12A rotates independently of clutch plate 36. This disengaged configuration is shown in FIG. 3B. To engage clutch mechanism 30, electrical power (e.g. 12V DC) is supplied to coil 58. When coil 58 energizes, clutch mechanism 30 moves to its engaged configuration. More particularly, coil 58 exerts magnetic flux on armature plate 52 to draw armature plate 52 toward PTO pulley 12A (i.e. from left to right in the illustrated view of FIG. 3B). Armature plate 52 is connected to clutch plate 36, such that the movement of armature plate 52 draws clutch plate 36 into frictional contact with PTO pulley 12A. When clutch plate 36 frictionally engages PTO pulley 12A, the rotation of PTO pulley 12A causes corresponding rotation of clutch plate 36 (including receptacle 54 and PTO shaft 40 (FIG. 2C) received in receptacle 54). When power is removed from coil 58, spring mechanisms 50 move clutch mechanism 30 back to its disengaged state, where clutch plate 36 is spaced apart from PTO pulley 12A.

Clutch mechanism 30 shown in FIG. 2 and FIG. 3 is only one exemplary embodiment of a clutch mechanism that may be coupled between engine 10 and the output of power take-off 12 (e.g. PTO port 32, PTO mount flange 38 and/or PTO shaft 40). In other embodiments, other clutch mechanisms and/or modulators of various forms may be provided between engine 10 and the output of power take-off 12. By way of non-limiting example, such clutch mechanisms could comprise belt clutches (including variable speed belt clutches or modulators having variable width pulleys), basket clutches, centrifugal clutches, cone clutches, dog clutches, hydraulic clutches, overrunning clutches, wrap-spring clutches and/or the like. In some embodiments, variable speed modulators (including, without limitation, variable-speed clutches) could be incorporated between engine 10 and the output of power take-off 12 to provide variable speed capability to vary the load applied to engine 10 and the corresponding output of the load. Control of such variable speed modulators is described in more detail below.

Providing a clutch mechanism between engine 10 and the output of power take-off 12 (i.e. PTO shaft 40) gives rise to a number of advantages. Using such a clutch mechanism, the output of power take-off 12 (e.g. PTO shaft 40 and any accessory equipment coupled thereto) can be disengaged from engine 10. It may be desirable to disengage the output of power take-off 12 from engine 10 during start up or warm up periods, for example. Such disengagement may facilitate easier starting and/or warm up (e.g. by load limiting) and correspondingly reduce wear on engine 10. Further, since power take-off 12 may be standardized, this allows accessory equipment to be designed expressly for the standard PTO port instead of having to interface with a clutch which may be manufactured by a third party. Furthermore, as discussed below, a clutch mechanism which is located between engine 10 and the output of power take-off 12 and which is a part of a multi-function system 11 may be designed to be controlled by a controller 17 of the multi-function system 11 to permit control of the power delivered to the output of power take-off 12 and any attached accessory device. This contrasts with third party clutches, which may be relatively more difficult to control with a controller that is not manufactured by the same manufacturer as multi-function system 11.

In some embodiments, multi-function system 11 and/or engine 10 may be provided with a load-management controller 17 (FIG. 1F). Controller 17 may interact with and control the other functional components of multi-function system 11, engine 10 and/or power take-off 12. By way of non-limiting example, controller 17 may comprise any suitable digital controller, such as, for example, a suitably configured computer, microprocessor, microcontroller, field-programmable gate array (FPGA), other type of programmable logic device, pluralities of the foregoing, combinations of the foregoing, and/or the like. Controller 17 may have access to software which may be stored in computer-readable memory (not shown) accessible to controller 17 and/or in computer-readable memory that is integral to controller 17. Controller 17 may be configured to read and execute such software instructions and, when executed by controller 17, such software may cause controller 17 to implement some of the functionalities described herein. Controller 17 is not limited to being a digital or electronic controller. In some embodiments, controller 17 could comprise a pneumatic (e.g. air-solenoid) based controller, a mechanical (e.g. cable-pull) based controller and/or the like. In some embodiments, controller 17 may be automatic, but this is not necessary. In some embodiments, controller 17 may be effected in part by a human operator (e.g. a human operated throttle control and/or the like). Controller 17 may have access to one or more sensors (not shown in FIG. 1F) for detecting operational characteristics of multi-function system 11, engine 10 and/or power take-off 12.

Controller 17 may monitor the loading of engine 10 (e.g. using suitable sensor(s)) and may use its clutch mechanism to lower the power available to power take-off 12 (and its load) or to disconnect power take-off 12 (and its load) from engine 10 as required. For example, the power available at power take-off 12 could be controlled by permitting a suitably configured clutch mechanism to slip, by cyclic (e.g. pulse width modulated) control of the engagement of a suitable clutch mechanism, using a variable speed transmission, using a variable speed clutch mechanism (e.g. a belt clutch mechanism having a variable width pulley), and/or the like. Additionally or alternatively, a clutch mechanism may be provided which comprises a multi-speed drive. Controller 17 may thereby cause multi-function system 11 to maintain a priority load (such as maintaining the speed/power delivered to generator 14 as compared to some other accessory or load service). Controller 17 may vary other loads (which may or may not include the load on power take-off 12) as required to maximize the power available to particular devices and/or to balance the power available between particular devices, while ensuring engine 10 is not put in an overload condition. Using suitable sensors, controller 17 could monitor other engine diagnostics (such as coolant temperature, oil pressure, exhaust temperature, oil temperature, generator characteristics (e.g. frequency) and/or the like) and cause the clutch mechanism to disengage power take-off 12 (or to reduce the power available at power take-off 12), if, for example, one or more of such sensors detects a corresponding characteristic that is outside of an acceptable range. Additionally or alternatively, using information from such sensors, controller 17 could disengage power from some other device of multi-function system 11 (or reduce power available at such other device(s) of multi-function system 11), if, for example, one or more of such sensors detects a corresponding characteristic that is outside of an acceptable range.

Figure 4:
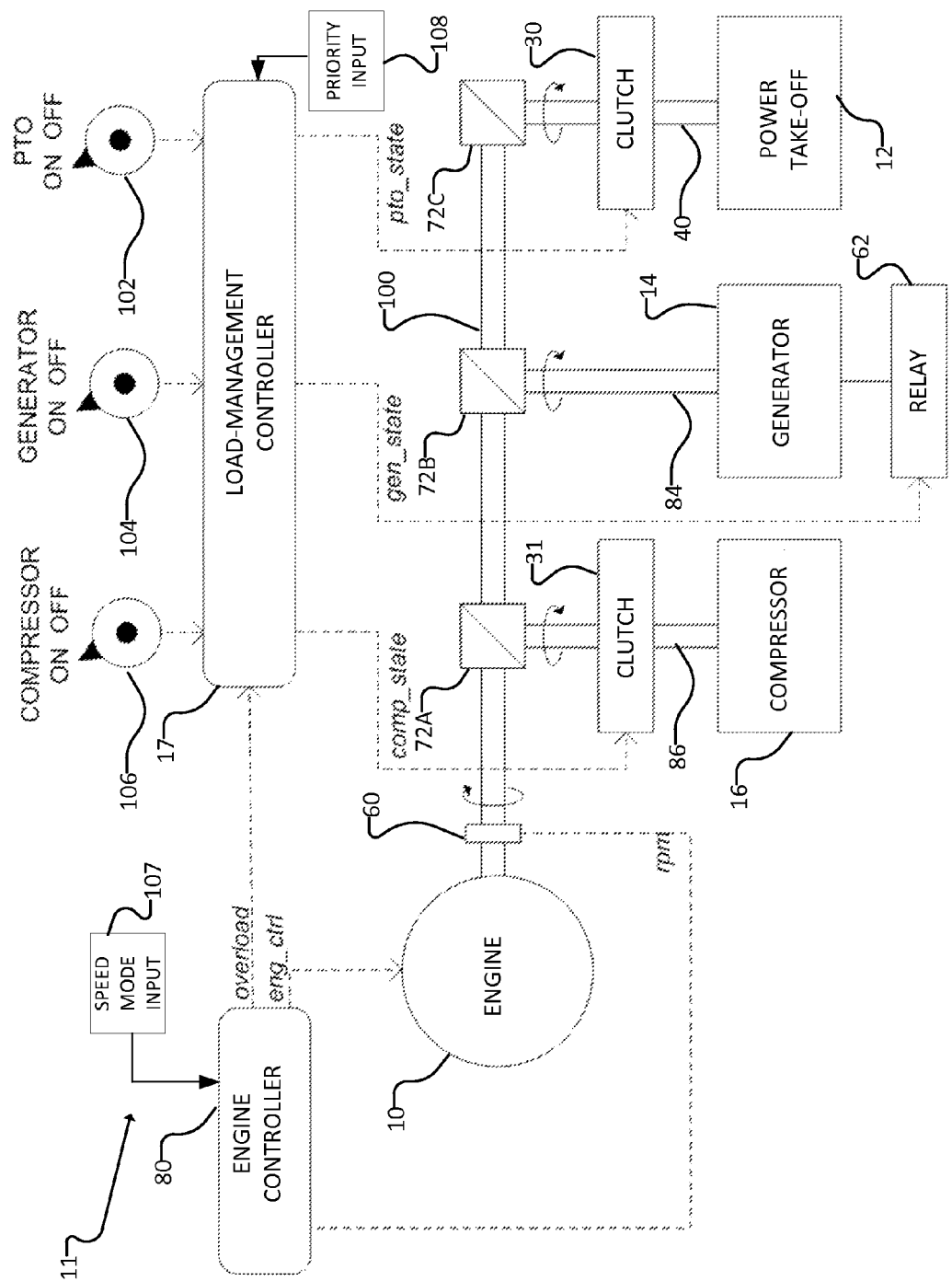
FIG. 4 is a schematic view of a multi-function system having load management according to an example embodiment.

FIG. 4 shows a multi-function system 11 having load management according to an example embodiment. In the FIG. 4 embodiment, system 11 comprises, and engine 10 provides power to, power take-off 12, air compressor 16, and generator 14 (capable of both AC and DC output), which may be referred to as load services. Power take-off 12 may have the features of power take-off 12 described above. In some embodiments, system 11 may comprise other load services which may also be powered by engine 10, such as battery booster, welder, or a hydraulic pump. In the illustrated embodiment, power take-off 12, generator 14, and air compressor 16 are coupled to crankshaft 100 of engine 10 through mechanical couplings 72A, 72B, 72C, respectively. Mechanical coupling 72A, 72B, 72C (collectively, mechanical couplings 72) may comprise direct mechanical couplings, fixed gear couplings (with or without associated gear ratios), belt and pulley coupling systems (with or without drive speed ratios), a combination of the foregoing and/or the like. Mechanical couplings 72 allow crankshaft 100 to drive power take-off 12, generator 14, and air compressor 16 through PTO shaft 40, generator shaft 84, and compressor shaft 86, respectively.

In the FIG. 4 embodiment, clutch mechanism 30 is operatively located between mechanical coupling 72C and power take-off 12 for regulating the operation of power take-off 12 (e.g. by engaging or disengaging mechanical coupling 72C from power take-off 12 or by otherwise engaging or disengaging engine 10 and/or crankshaft 100 from power take-off 12). Clutch 30 may have the features of clutch 30 described above. In the FIG. 4 embodiment, clutch mechanism 31 is operatively located between mechanical coupling 72A and compressor 16 for regulating the operation of compressor 16 (e.g. by engaging or disengaging mechanical coupling 72A from compressor 16 or by otherwise engaging or disengaging engine 10 and/or crankshaft 100 from compressor 16). In the FIG. 4 embodiment, relay 62 is configured to control the operation of generator 14 by cutting off the circuit which powers the field windings of the generator. When the field windings are electrically disconnected from generator 14 by relay 62, generator 14 does not put a substantial load on engine 10 unless the speed of engine 10 is changing. In some embodiments, relay 62 could alternatively be configured to control the operation of generator 14 by cutting of the electrical load from generator 14 (e.g. engaging/disengaging a switch in the circuit which provides current to the electrical load (not shown)). It will be appreciated that the functionality of relay 62 could be implemented by digital logic, some other form of electrically activated switch and/or the like. In some embodiments, a mechanical switch or the like (e.g. a clutch) located between coupling 72B and generator 14 could be used to control the operation of generator 14.

System 11 of the FIG. 4 embodiment comprises user-interface controls (e.g. switches, toggles, selectors, buttons and/or the like) 102, 104, 106, through which a user can independently enable or disable each of power take-off 12, generator 14 and air compressor 16, respectively. In the FIG. 4 embodiments, user-interface controls 102, 104, 106 have one of two states: ON or OFF. In the illustrated embodiment, load-management controller 17 may manage the load of engine 10 by operating clutch mechanism 30, 31 to enable or disable the operation of power take-off 12 and air compressor 16 and/or operating relay 62 to enable or disable the operation of generator 14 based on the states of user-interface controls 102, 104, 106. Load-management controller 17 may have the features of controller 17 described above. The states of user-interface controls 102, 104, 106 may be input to (or otherwise read or received by) load-management controller 17 and, based on the states of user-interface controls 102, 104, 106, load-management controller 17 provides signals (shown in FIG. 4 as comp_state, gen_state, and pto_state) to clutch mechanism 31, relay 62 and clutch mechanism 30 enable or disable the operation of compressor 16, generator 14 and power take-off 12, respectively.

Load-management controller 17 may manage the load of engine 10 by managing the distribution of power to load services (e.g. to power take-off 12, generator 14, air compressor 16 and/or any other load services (not shown in the FIG. 4 embodiment)). In some embodiments, load-management controller 17 may control the operation of load services based on a configurable (e.g. user configurable) or predetermined (e.g. default) priority or ranking assigned to each of the load services associated with system 11. Non-priority (or relatively low-priority) load services which are enabled can be disabled by load-management controller 17 through control of clutch mechanisms 30, 31 or relay 62, as applicable. In some embodiments, the priority of load services is fixed by the manufacturer of multi-function system 11. In some embodiments, the priority for some of the load service(s) of system 11 may be user-configurable while other(s) are not. In cases where the priority of load services is user-configurable, system 11 may optionally comprises a user-interface control 108 (as shown in FIG. 4), where a user can input a priority ranking for the load services of system 11, although this is not necessary.

In some embodiments: where power take-off 12 is operatively connected to a safety-critical load (e.g. a crane or the like), it could be configured to have relatively high priority; but where power take-off is operatively connected to a less safety-critical load, it could be configured to have a lesser priority. In some embodiments: generator 14 may be assigned a relatively high priority for applications where uses a moderate amount of power from engine 10 (e.g. when generator 14 is providing electricity to work-site lighting) or when generator 14 is connected to support services that need to remain active; and generator 14 may be assigned a relatively low priority when generator 14 uses a large amount of power or when generator 14 is used to support services that do not need to remain active (e.g. when generator is providing power to a work-site music player or the like). Similarly, in some embodiments: compressor 16 may be assigned relatively low priority when it is connected to relatively low importance services; and compressor 16 may be assigned relatively high priority when it is connected to relatively high importance services. In some embodiments, power take-off 12 and generator 14 may be configured to have default or predetermined priorities which are relatively high as compared to compressor 16.

In the FIG. 4 embodiment, system 11 comprises an engine controller 80 which may be configured (e.g. with suitable software) to ensure that engine 10 is operating with sufficient output power to service the load demands of the load services and at a target operational rotational speed (or in a target range of rotational speeds). By way of non-limiting example, engine controller 80 may comprise any suitable digital controller, such as, for example, a suitably configured computer, microprocessor, microcontroller, field-programmable gate array (FPGA), other type of programmable logic device, pluralities of the foregoing, combinations of the foregoing, and/or the like. Engine controller 80 may have access to software which may be stored in computer-readable memory (not shown) accessible to engine controller 80 and/or in computer-readable memory that is integral to engine controller 80. Engine controller 80 may be configured to read and execute such software instructions and, when executed by engine controller 80, such software may cause engine controller 80 to implement some of the functionalities described herein. Engine controller 80 is not limited to being a digital or electronic controller. In some embodiments, engine controller 80 could comprise a pneumatic (e.g. air-solenoid) based controller, a mechanical (e.g. cable-pull) based controller and/or the like. In some embodiments, engine controller 80 may operate automatically, but this is not necessary. In some embodiments, engine controller 80 may be effected in part by a human operator (e.g. a human operated throttle control and/or the like). In the FIG. 4 schematic illustration (and in some embodiments), engine controller 80 is implemented separately from load-management controller 17. In some embodiments, engine controller 80 and load-management controller 17 may be implemented or otherwise embodied by a single controller.

Engine controller 80 may interface with engine 10 (in the illustrated embodiment, via signal eng_ctrl) to increase or decrease the output speed of engine 10 depending on the power usage of the different load services. In particular embodiments, engine controller 80 is configured to operate engine 10 in two distinct speed modes: a high output mode with a corresponding high target rotational speed or high target rotational speed range (e.g. a high target of 3600 rpm and/or a high target range of 3400-3800 rpm); and a low output mode with a corresponding low target rotational speed or low target rotational speed range (e.g. a low target of 2600 rpm and/or a low target range of 2400-2800 rpm). Engine controller 80 may use signal eng_ctrl for this purpose. System 11 may optionally comprise a suitable user-interface control 107 (as shown in FIG. 4) by which a user can input the desired speed mode to engine controller 20, although this is not necessary and the speed mode can be determined by system 11 as described below. In some embodiments, engine controller 80 may be configured to operate engine 10 in a different number (e.g. only one or more than two) of distinct speed modes. In the illustrated embodiment, engine controller 80 is connected to receive engine speed feedback information from rotational speed sensor 60 (in the illustrated embodiment, via signal rpm) and uses this sensed information to control engine 10. In some embodiments, engine controller 80 is configured to shut off engine 10 if it is determined that no load is required by any of the load services.

In some circumstances (e.g. where multiple load services are enabled and are consuming significant power), engine 10 may become overloaded, in which case engine controller 80 may determine that engine 10 cannot maintain the target rotational speed (or rotational speed range). By way of non-limiting example, engine controller 80 can make this overload determination: based on feedback information from rotational speed sensor 60 being below a target rotational speed or a target rotational speed range by a threshold amount (e.g. more than 250 rpm below the target range); based on feedback information from rotational speed sensor 60 being below a target rotational speed or a target rotational speed range by a threshold time (e.g. below the target range for more than 1, 2 or 5 seconds); and/or the like. Once engine controller 80 determines an overload condition to exist, engine controller 80 may then communicate this overload condition to load-management controller 17 (in the illustrated embodiment, via signal overload), whereupon load-management controller 17 may disable non-priority (or relatively low-priority) load services to reduce the load on engine 10.

In one particular embodiment, engine controller 80 and load-management controller 17 cause system 11 to operate in accordance with the table below:

TABLE 1

System Response to Engine Overloading

Load Service States

| Power take-off (PTO) | Generator (GEN) | Compressor (COMP) | Engine Speed Mode | Overload Action (RPM < Threshold) |
|---|---|---|---|---|
| ON | OFF | OFF | HIGH | None |
| ON | ON | OFF | HIGH | None |
| ON | OFF | ON | HIGH | Disable COMP |
| ON | ON | ON | HIGH | Disable COMP |

TABLE 1-continued

System Response to Engine Overloading

Load Service States

| Power take-off (PTO) | Generator (GEN) | Compressor (COMP) | Engine Speed Mode | Overload Action (RPM < Threshold) |
|---|---|---|---|---|
| OFF | ON | OFF | HIGH | None |
| OFF | ON | ON | HIGH | Disable COMP |
| OFF | OFF | ON | HIGH/LOW/OFF | RPM Set Point to HIGH |
| OFF | OFF | OFF | HIGH/LOW/OFF | N/A |

For the embodiment which operates in accordance with Table 1:

when either power take-off 12 or generator 14 are enabled (e.g. by user-interface controls 102, 104), engine controller 80 defaults to a high speed mode of operation for engine 10;

when only compressor 16 is enabled (e.g. by user-interface control 106), the engine controller 80 may set the target engine speed one that is appropriate for the load condition, which may be a high or low target speed or which may be OFF (if no load is detected or required). If engine 10 is turned OFF (i.e. because there are no load requests), then controller 80 could then restart engine 10 if a load request is made;

if (power take-off 12 or generator 14) and compressor 16 are active and an overload condition is detected, engine controller 80 and load-management controller 17 will operate clutch mechanism 31 to disable compressor 16, as (in the Table 1 embodiment) power take-off pot 12 and generator 14 are assigned priority over compressor 16. By diverting load from compressor 16, engine 10 can continue to supply power to power take-off 12 and generator 14 and recover to its target rotational speed.

Figure 5:
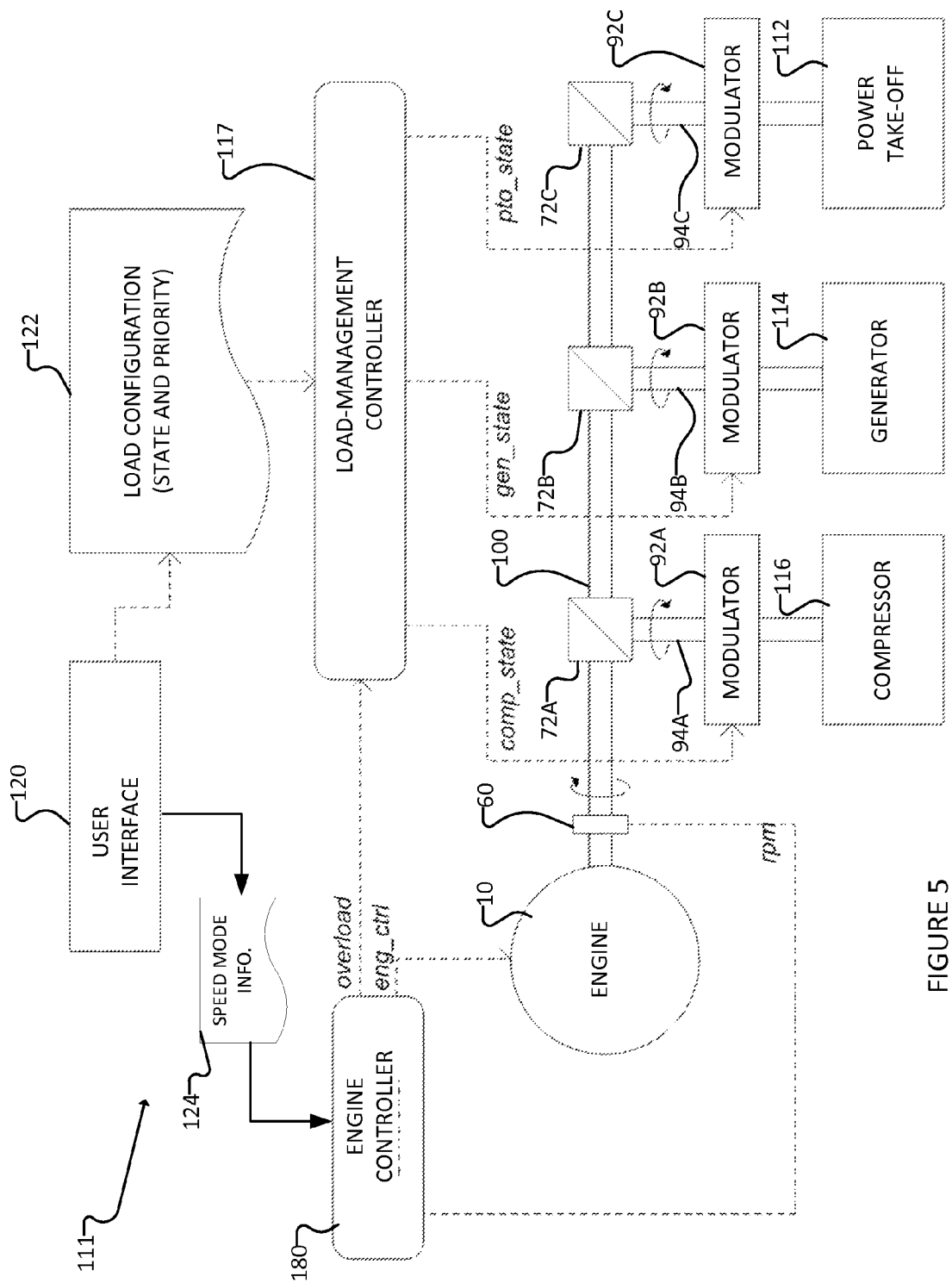
FIG. 5 is a schematic view of a multi-function system having load management according to an example embodiment.

FIG. 5 is a schematic view of a multi-function system 111 having load management according to another example embodiment. In many respects, multi-function system 111 of FIG. 5 is similar to multi-function system 11 shown in FIG. 4. In particular, the FIG. 5 embodiment of multi-function system 111 comprises a number of components, including engine 10, crankshaft 100, mechanical couplings 72, power take-off 12, generator 14, compressor 16 and engine speed sensor 60 which may be substantially similar to the corresponding components of the FIG. 4 multi-function system 11. In the FIG. 5 embodiment, multi-function system 111 comprises similar load services (power take-off 112, generator 114 and compressor 116) to those of system 11, although like multi-function system 11, system 111 may comprise additional or alternative load systems.

Multi-function system 111 differs from multi-function system 11 in that compressor 116, generator 114 and power take-off 112 of the FIG. 5 embodiment are operatively driven by crankshaft 100 of engine 10, mechanical couplings 72A, 72B, 72C and drive shafts 94A, 94B, 94C via modulators 92A, 92B, 92C (collectively, modulators 92). Modulators 92 differ from clutches 30, 31 and relay 62 in that modulators 92 may be controlled by load-management controller 117 (e.g. in the illustrated embodiment, via signals comp_state, gen_state and pto_state) to vary the load (or mechanical power) drawn by compressor 116, generator 114 and power take-off 112 over corresponding power ranges (in contrast to engaging and disengaging the load services). In some embodiments, one or more of modulators 92 may be incorporated into their respective load service. For example, modulator 92A may be incorporated into compressor 116.

Multi-function system 111 also differs from multi-function system 11 in that multi-function system 111 comprises a user interface 120 in communication with load-management controller 117. User interface 120 of the FIG. 5 embodiment is configured to permit a user to input load configuration information 122 relating to load services (e.g. compressor 116, generator 114, power take-off 112) which may be received by load-management controller 117. Load configuration information 122 may comprise, inter alia: information corresponding to priority as between load services; and/or information corresponding to desired operational state(s) of any one or more of the load services. The priority as between load services may be similar to that described above for system 11—that is, a user may assign relative priorities as between the load services. In some embodiments, the operational states of the load services may also be similar to those of system 11 described above—that is, enabled or disabled.

In some embodiments, however, the operational states of any one or more of the load services may be specified to be any state over a range of operational characteristics and over a corresponding range of power draw. Such operational states could then be communicated by load-management controller 117 to modulators 92 (in the illustrated embodiment, via any one or more of signals comp_state, gen_state and pto_state), which may in turn modulate their respective load services to operate with the desired state (i.e. the desired operational characteristics and the corresponding power draw). By way of non-limiting example, a user could specify (via user interface 120) that they want compressor 116 to operate at 15 cubic feet per minute (cfm) and at a corresponding power draw, and load management controller 117 could send a corresponding signal (e.g. comp_state) to modulator 92A, which would in turn control compressor 116 to operate at 15 CFM with the corresponding power draw. It will be appreciated that the user may input the desired operational characteristic for a load service and/or the desired power draw for the load service, but need not input both of these parameters as the correspondence between these parameters may be maintained by load-management controller 117.

System 111 comprises an engine controller 180. In some embodiments, engine controller 180 and load-management controller 117 may be implemented or otherwise embodied by the same controller. Like engine controller 80 of system 11, engine controller 180 of system 111 may be configured to operate engine 10 in a plurality of distinct speed modes—e.g. a high output mode with a corresponding high target rotational speed or high target rotational speed range (e.g. a high target of 3600 rpm and/or a high target range of 3400-3800 rpm); and a low output mode with a corresponding low target rotational speed or low target rotational speed range (e.g. a low target of 2600 rpm and/or a low target range of 2400-2800 rpm). Engine controller 180 may use signal eng_ctrl for this purpose. User interface 120 of multi-function system 111 may also optionally be used to input speed mode information 124 to engine controller 180. Such speed mode information 124 may be similar to that provided by optional speed mode input 107 of system 11 described above and may involve a user specifying a desired speed mode for engine 10 from among a plurality of distinct speed modes. For example, in an embodiment, where engine controller 180 is configured to operate engine 10 in two distinct speed modes, speed mode information 124 may specify a high or low speed mode.

Engine controller 180 may detect an engine overload condition or otherwise make a determination that engine 10 is overloaded using information from rotational speed sensor 60 in a manner that is substantially similar to that of engine controller 80 described above. Once an overload condition is determined, engine controller 180 may communicate the overload condition to load-management controller 117 (in the illustrated embodiment, via signal overload). Upon receiving the overload indication, load-management controller 117 may use one or more modulators 92 to reduce the power delivered to one or more of the load services and to thereby reduce the total load on engine 10. Load-management controller 117 may use one or more modulators 92 to completely disengage their corresponding load services and to thereby reduce the total load on engine 10. However, since modulators 92 are capable of controlling their respective load services over corresponding operational ranges and corresponding ranges of power draw, load-management controller 117 may additionally or alternatively use one or more modulators 92 to reduce the power drawn by their corresponding load services within the controllable range of modulators 92 to reduce the total load on engine 10 to the point where there is no longer an overload condition detected by engine controller 180. For example, where compressor is operating at 15 cfm (with a corresponding power draw), load-management controller 117 may reduce this operational state somewhat (e.g. to 12 cfm) to determine if the corresponding reduction in drawn power will alleviate the overload condition.

In the event of an overload condition, the selection (by load-management controller 117) of which load services should have their power reduced may be made in accordance with the priority information, which may form part of the user-input load configuration information 122. Like system 11 described above, the priority as between load services need not be user-configurable. In some embodiments, the priority as between load services may be predetermined or set to some default priority by the provider of system 111. In some embodiments, the priority information for system 111 may comprise a sequence or algorithm for load shedding, which may be implemented by load-management controller and which may involve reducing the load to a number of load services. For example, in accordance with such priority information, load-management controller could reduce the power drawn by compressor 16 up to 25% and may then switch to reducing the power drawn by generator 14 by up to 25% before switching back to reducing the power drawn by compressor 16 again. It will be understood that where the priority information specifies such a sequence, it is not necessary to complete the sequence if the overload condition is alleviated.

Figure 6:
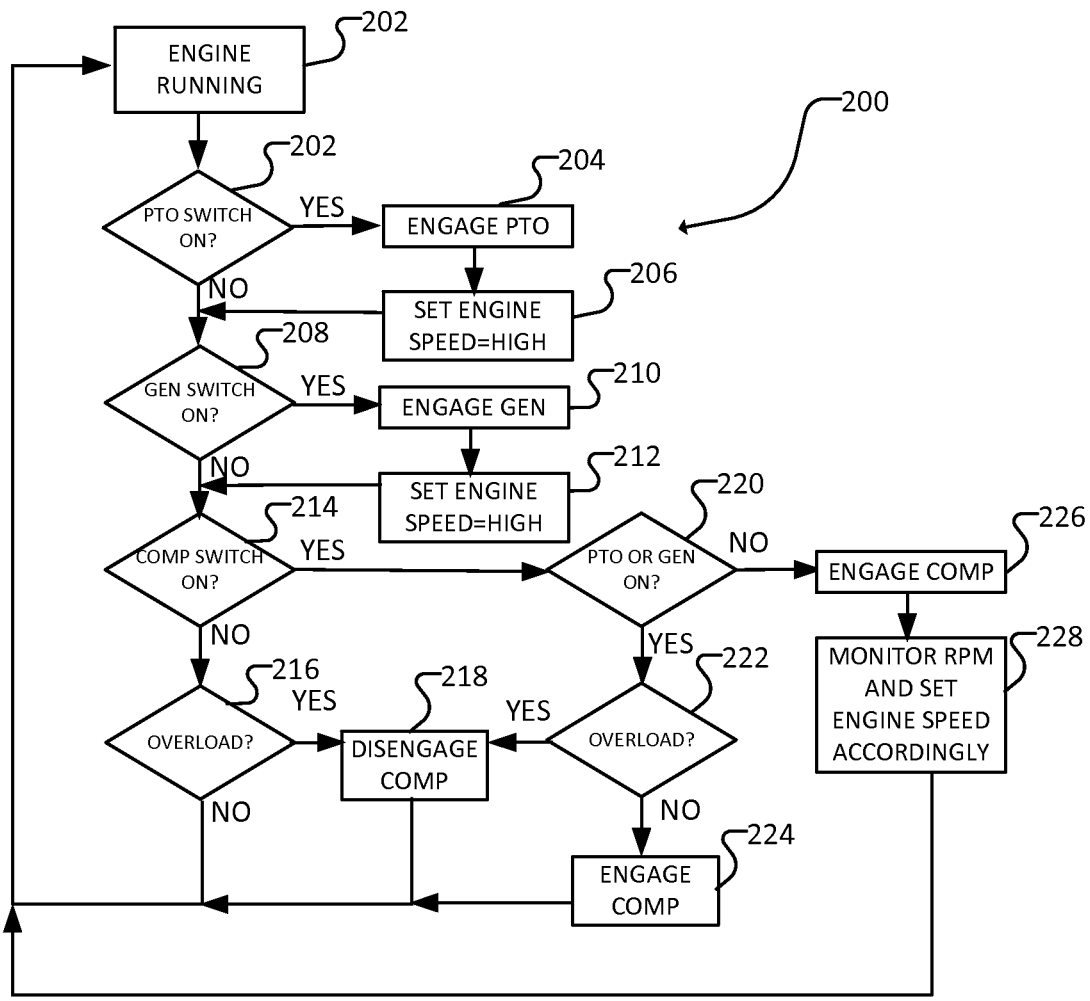
FIG. 6 is a flow chart illustrating an example method of managing load in a multi-function system having an engine according an example embodiment.

FIG. 6 is a flow chart illustrating an example method 200 for controlling the load of multi-function system 11 in accordance with the particular exemplary embodiment of Table 1. For the illustrative example of method 200, power take-off 12 and generator 14 are assigned equal and high priority and compressor 16 is assigned relatively low priority. Method 200 may be implemented by engine controller 80 and load-management controller 17. Once engine 10 is started and running (block 201), method 200 proceeds to block 202 to determine if user-interface control 102 (FIG. 4) for power take-off 12 is in its ON state. If the block 202 inquiry is positive, then method 200 proceeds to block 204, where power take-off 12 is engaged (e.g. via clutch mechanism 30), and to block 206, where engine controller 80 sets the speed of engine 10 to HIGH. If the block 202 inquiry is negative (or after block 206), method 200 proceeds to block 208 to determine if user-interface control 104 (FIG. 4) for generator 14 is in its ON state. If the block 208 inquiry is positive, then method 200 proceeds to block 210, where generator 14 is engaged (e.g.

via relay 62), and to block 212, where engine controller 80 sets the speed of engine 10 to HIGH (if it is not set to HIGH already).

If the block 208 inquiry is negative (or after block 212), method 200 proceeds to block 214 to determine if user-interface control 106 for compressor 16 is in its ON state. If the block 214 inquiry is negative, then method 200 proceeds to block 216 which involves monitoring the rotational speed of engine 10 and determining if an overload condition exists (e.g. because engine 10 can not keep up to the HIGH speed). If there is no overload condition, then method 200 loops back to block 202. If there is an overload condition (i.e. the block 216 inquiry is positive), then method 200 proceeds to block 218, where compressor 16 is disengaged (e.g. via clutch mechanism 31) or where the disengaged state of compressor 16 is maintained, before method 200 loops back to block 202. Returning to block 214, if the block 214 inquiry is positive, then method 200 proceeds to block 220 which involves an inquiry as to whether power take-off 12 or generator 14 is engaged. If the block 220 inquiry is negative, method 200: proceeds to block 226, where compressor 16 is engaged (e.g. via clutch mechanism 31); proceeds to block 228, which involves monitoring the rotational speed of engine 10 and, depending on the output power required by compressor 16, setting the desired engine speed of engine 10 to HIGH or LOW accordingly; and then loops back to block 202. If the block 220 inquiry is positive, then method 222 proceeds to block 222 which involves monitoring the rotational speed of engine 10 and determining if an overload condition exists (e.g. because engine 10 cannot keep up to the currently set speed). If there is no overload condition detected in block 222, then compressor 16 is engaged (e.g. via clutch mechanism 31) in block 224 before looping back to block 202. If there is an overload condition detected in block 222, then method 200 proceeds to block 218 which involves disengaging compressor 16 (e.g. via clutch mechanism 31) before looping back to block 202.

As will be apparent to those skilled in the art in the light of the foregoing disclosure, many alterations and modifications are possible in the practice of this invention without departing from the spirit or scope thereof. For example:

- In some embodiments, the overload condition of engine 10 is evaluated (e.g. by engine controller 80 in blocks 216 or 222 of method 200 or by engine controller 180) based on measured rotational speed as detected by rotational speed sensor 60. These measurements may filtered out to reduce the system sensitivity to minor or temporary fluctuations in engine speed. In some embodiments, engine 10 is considered to be overloaded when the engine speed is below a predetermined or configurable (e.g. user-configurable) threshold for a predetermined or configurable (e.g. user-configurable) time period and/or when the rate of change engine speed is above a predetermined threshold.
- In some embodiments, the speed of engine 10 is assessed (e.g. by engine controller 80 in blocks 216 or 222 of method 200 or by engine controller 180) based on averaged/buffered measurement of the rotations per minute of crankshaft 100. In some embodiments, rotational speed information of engine 10 is calculated as an average of different speed measurements that are saved by rotational speed sensor 60 and/or by engine controller 80, 180 and added to a moving average buffer.
- In some embodiments, the rate of change of the speed of engine 10 could additionally or alternatively be monitored and controlled in a manner similar to the monitoring of speed described herein and corresponding control of clutches, 30, 31, relay 62 and/or modulators 92 could be effected on the basis of such monitoring. Monitoring the rate of change of the speed of engine 10 could be used to determine if a sudden high load has been engaged using a suitable thresholding process, for example.
- In some embodiments, the size of the load services attached to system 11, 111 may be limited so that the combined load of all load services is at or below the maximum engine power.
- In some embodiments, a engageable/disengageable power take-off may be built directly into engine 10 (e.g. without a belt drive or the like).
- In some embodiments, priority information may be provided (e.g. by a user or otherwise) wherein specific functions of a load service may be prioritized, rather than the entire load service being prioritized.

While a number of exemplary aspects and embodiments have been discussed above, those of skill in the art will recognize certain modifications, permutations, additions and sub-combinations thereof.

It is therefore intended that the scope of the invention should not be limited by the embodiments set forth in the examples set out above, but should be given the broadest interpretation consistent with the description as a whole.

What is claimed is:

1. An apparatus comprising:
    an engine;
    a power take-off comprising a power take-off port operatively connected to be driven by the engine and connectable to a corresponding load service;
    one or more additional load services operatively connected to be driven by the engine;
    a PTO modulator coupled to the power take-off and operable to modulate power drawn, from the engine, by the power take-off;
    one or more load-service modulators respectively coupled to the one or more additional load services, each load-service modulator operable to modulate power drawn, from the engine, by its corresponding additional load service; and
    a controller configured to control the PTO modulator and the one or more load-service modulators to thereby control the power drawn from the engine based on a detected condition of the engine and a priority as between the power take-off and the one or more additional load services;
    wherein the power take-off port is located remotely from a crankshaft of the engine in a location which provides space for operative connection of any one of a variety of accessory devices to the power take-off port, the apparatus comprising: a flywheel connected to rotate with the crankshaft; an engine pulley coupled to rotate with the flywheel; a power take-off pulley coupled, via the PTO modulator, to rotate with the power take-off port; and a belt entrained around the engine pulley and the power take-off pulley for transferring rotational energy therebetween.

2. The apparatus of claim 1 wherein the PTO modulator comprises a modulator having an ON state, wherein the power take-off is connected to draw power from the engine and an OFF state, wherein the power take-off is de-coupled from the engine so as not to draw power therefrom, and wherein at least one of the one or more load-service modulators comprises a modulator having an ON state, wherein its corresponding additional load service is connected to draw power from the engine and an OFF state, wherein its corresponding additional load service is de-coupled from the engine so as not to draw power therefrom.

3. The apparatus of claim 1 wherein the engine condition comprises an overload condition which comprises an engine speed being below a threshold level.

4. The apparatus of claim 1 comprising a user interface or one or more user-interface controls for user configuration of the priority as between the power take-off and the one or more additional load services.

5. The apparatus of claim 1 wherein the PTO modulator comprises a variable-speed modulator operative for controlling the power drawn, from the engine, by the power take-off by increasing and decreasing the power drawn, from the engine, by the power take-off.

6. An apparatus comprising:
an engine;
a power take-off comprising a power take-off port operatively connected to be driven by the engine and connectable to a corresponding load service;
one or more additional load services operatively connected to be driven by the engine;
a PTO modulator coupled to the power take-off and operable to modulate power drawn, from the engine, by the power take-off;
one or more load-service modulators respectively coupled to the one or more additional load services, each load-service modulator operable to modulate power drawn, from the engine, by its corresponding additional load service; and
a controller configured to control the PTO modulator and the one or more load-service modulators to thereby control the power drawn from the engine based on a detected condition of the engine and a priority as between the power take-off and the one or more additional load services;
wherein the PTO modulator comprises a variable-speed modulator operative for controlling the power drawn, from the engine, by the power take-off by increasing and decreasing the power drawn, from the engine, by the power take-off.

7. The apparatus of claim 6 wherein the power take-off port is located remotely from a crankshaft of the engine in a location which provides space for operative connection of any one of a variety of accessory devices to the power take-off port, the apparatus comprising: a crankshaft pulley coupled to rotate with the crankshaft; a power take-off pulley coupled, via the PTO modulator, to rotate with the power take-off port; and a belt entrained around the crankshaft pulley and the power take-off pulley for transferring rotational energy therebetween.

8. The apparatus of claim 6 wherein at least one of the one or more load-service modulators comprises a variable-speed modulator operative for controlling the power drawn, from the engine, by its corresponding additional load service by increasing and decreasing the power drawn, from the engine, by its corresponding additional load service.

9. The apparatus of claim 6 wherein the engine condition comprises an overload condition which comprises an engine speed being below a threshold level and wherein the overload condition comprises the engine speed being below the threshold level, relative to a configurable desired engine speed, for a threshold period of time.

10. An apparatus comprising:
an engine;
a power take-off comprising a power take-off port operatively connected to be driven by the engine and connectable to a corresponding load service;
one or more additional load services operatively connected to be driven by the engine;
a PTO modulator coupled to the power take-off and operable to modulate power drawn, from the engine, by the power take-off;
one or more load-service modulators respectively coupled to the one or more additional load services, each load-service modulator operable to modulate power drawn, from the engine, by its corresponding additional load service; and
a controller configured to control the PTO modulator and the one or more load-service modulators to thereby control the power drawn from the engine based on a detected condition of the engine and a priority as between the power take-off and the one or more additional load services;
wherein the engine condition comprises an overload condition which comprises an engine speed being below a threshold level; and
wherein the overload condition comprises the engine speed being below the threshold level, relative to a configurable desired engine speed, for a threshold period of time.

11. The apparatus of claim 10 wherein the configurable desired engine speed is configurable to any one of a plurality of discrete speed modes, each speed mode comprising a corresponding target speed.

12. The apparatus of claim 11 comprising a user interface or one or more user-interface controls for user configuration of any one or more of: the plurality of discrete speed modes, the corresponding target speeds, the threshold periods of time; and the threshold levels.

13. An apparatus comprising:
an engine;
a power take-off comprising a power take-off port operatively connected to be driven by the engine and connectable to a corresponding load service;
one or more additional load services operatively connected to be driven by the engine;
a PTO modulator coupled to the power take-off and operable to modulate power drawn, from the engine, by the power take-off;
one or more load-service modulators respectively coupled to the one or more additional load services, each load-service modulator operable to modulate power drawn, from the engine, by its corresponding additional load service; and
a controller configured to control the PTO modulator and the one or more load-service modulators to thereby control the power drawn from the engine based on a detected condition of the engine and a priority as between the power take-off and the one or more additional load services;
wherein the controller is configured to control the PTO modulator and the one or more load service modulators to thereby control the output power drawn from the engine based on the detected engine condition and the priority as between the power take-off and the one or more additional load services by reducing the power drawn from the engine by reducing a power drawn by a lowest priority one of the power take-off and the one or more additional load services and, if the engine condition is not alleviated after reducing the power drawn by the lowest priority one of the power take-off and the one or more additional load services to zero, then reducing a power drawn by a different one of the power take-off and the one or more additional load services.

14. An apparatus comprising:
an engine;
a power take-off comprising a power take-off port operatively connected to be driven by the engine and connectable to a corresponding load service;
one or more additional load services operatively connected to be driven by the engine;
a PTO modulator coupled to the power take-off and operable to modulate power drawn, from the engine, by the power take-off;
one or more load-service modulators respectively coupled to the one or more additional load services, each load-service modulator operable to modulate power drawn, from the engine, by its corresponding additional load service; and
a controller configured to control the PTO modulator and the one or more load-service modulators to thereby control the power drawn from the engine based on a detected condition of the engine and a priority as between the power take-off and the one or more additional load services;
wherein the controller is configured to control the PTO modulator and the one or more load service modulators to thereby control the output power drawn from the engine based on the detected engine condition and the priority as between the power take-off and the one or more additional load services by reducing the power drawn from the engine by reducing a power drawn by a lowest priority one of the power take-off and the one or more additional load services by a first amount, the first amount less than a full power drawn by the lowest priority one of the power take-off and the one or more additional load services and, if the engine condition is not alleviated after reducing the power drawn by the lowest priority one of the power take-off and the one or more additional load services by the first amount, then reducing a power drawn by a different one of the power take-off and the one or more additional load services by a second amount, the second amount less than a full power drawn by the different one of the power take-off and the one or more additional load services.

15. The apparatus of claim 14 wherein the controller is configured to control the PTO modulator and the one or more load service modulators to thereby control the output power drawn from the engine based on the detected engine condition and the priority as between the power take-off and the one or more additional load services by further reducing the power drawn by the lowest priority one of the power take-off and the one or more additional load services by a third amount, if the engine condition is not alleviated after reducing the power drawn by the different one of the power take-off and the one or more additional load services by the second amount.

16. The apparatus of claim 14 wherein the controller is configured to control the PTO modulator and the one or more load service modulators to thereby control the output power drawn from the engine based on the detected engine condition and the priority as between the power take-off and the one or more additional load services by reducing a power drawn by a further different one of the power take-off and the one or more additional load services by a third amount, if the engine condition is not alleviated after reducing the power drawn by the different one of the power take-off and the one or more additional load services by the second amount.

17. An apparatus comprising:
an engine;
a power take-off comprising a power take-off port operatively connected to be driven by the engine and connectable to a corresponding load service;
one or more additional load services operatively connected to be driven by the engine;
a PTO modulator coupled to the power take-off and operable to modulate power drawn, from the engine, by the power take-off;
one or more load-service modulators respectively coupled to the one or more additional load services, each load-service modulator operable to modulate power drawn, from the engine, by its corresponding additional load service; and
a controller configured to control the PTO modulator and the one or more load-service modulators to thereby control the power drawn from the engine based on a detected condition of the engine and a priority as between the power take-off and the one or more additional load services;
wherein the one or more additional load services comprise a generator and a compressor; wherein the priority as between the power-take off and the one or more additional load services specifies that the compressor has a relatively low priority as compared to the generator and the power take-off; and wherein the controller is configured to control the PTO modulator and the one or more load-service modulators to thereby control the power drawn from the engine based on the detected condition of the engine and the priority as between the power take-off and the one or more additional load services by disengaging the compressor.

18. A method for managing the load of an engine driving a power take-off and one or more additional load services, the method comprising:
providing an engine, a power take-off comprising a power take-off port operatively connected to be driven by the engine and connectable to a corresponding load service; and one or more additional load services operatively connected to be driven by the engine;
detecting a speed of the engine; and
evaluating an overload condition based at least in part on the detected speed of the engine; and
if the overload condition is positive, controlling the power drawn by at least one of the power take-off and the one or more additional services to control power drawn from the engine in accordance with a priority as between the power take-off and the one or more additional services;
wherein evaluating the overload condition comprises determining that an engine speed is below a threshold level, relative to a configurable desired engine speed, for a threshold period of time.

19. A method according to claim 18 comprising using a moving average filter on a detected engine speed to determine the engine speed prior compared to the threshold level.

20. A method for managing the load of an engine driving a power take-off and one or more additional load services, the method comprising:
providing an engine, a power take-off comprising a power take-off port operatively connected to be driven by the engine and connectable to a corresponding load service; and one or more additional load services operatively connected to be driven by the engine;
detecting a speed of the engine; and
evaluating an overload condition based at least in part on the detected speed of the engine; and
if the overload condition is positive, controlling the power drawn by at least one of the power take-off and the one or more additional services to control power drawn from the engine in accordance with a priority as between the power take-off and the one or more additional services;
wherein the one or more additional load services comprise a generator and a compressor; wherein the priority as between the power-take off and the one or more additional load services specifies that the compressor has a relatively low priority as compared to the generator and the power take-off; and wherein the method comprises controlling the power drawn by the at least one of the power take-off and the one or more additional services to control power drawn from the engine in accordance with the priority as between the power take-off and the one or more additional services by disengaging the compressor.

* * * * *